(12) United States Patent
Tong et al.

(10) Patent No.: US 11,571,664 B2
(45) Date of Patent: Feb. 7, 2023

(54) DEEPLY GROOVED NANOPARTICLE-COATED NANOFIBERS

(71) Applicant: Nano and Advanced Materials Institute Limited, Hong Kong (HK)

(72) Inventors: Ho Wang Tong, Hong Kong (HK); Yu Hang Leung, Hong Kong (HK); Arthur Hong Kin Kwong, Hong Kong (HK); Connie Sau Kuen Kwok, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 1017 days.

(21) Appl. No.: 16/286,636

(22) Filed: Feb. 27, 2019

(65) Prior Publication Data

US 2020/0269193 A1 Aug. 27, 2020

(51) Int. Cl.
*B01D 69/12* (2006.01)
*D06M 10/08* (2006.01)
(Continued)

(52) U.S. Cl.
CPC ........... *B01D 69/12* (2013.01); *B01D 71/022* (2013.01); *B01D 71/08* (2013.01); *B01D 71/26* (2013.01);
(Continued)

(58) Field of Classification Search
CPC ...... B01D 69/12; B01D 71/022; B01D 71/08; B01D 71/26; B01D 71/34; B01D 71/38;
(Continued)

(56) References Cited

U.S. PATENT DOCUMENTS

| 2010/0224555 A1* | 9/2010 | Hoek | B01D 69/125 |
| | | | 427/322 |
| 2017/0203244 A1* | 7/2017 | Xia | B01D 39/2041 |

FOREIGN PATENT DOCUMENTS

| CA | 2173708 A1 | 10/1996 |
| CN | 101921450 A | 12/2010 |

(Continued)

OTHER PUBLICATIONS

Neubert et al. (Deposition of Electrospun Nanofibers and Electrospraying of Nanoparticles, IFMBE Proceedings 25, pp. 124-127, 2009) (Year: 2009).*

(Continued)

*Primary Examiner* — Hayden Brewster
(74) *Attorney, Agent, or Firm* — Idea Intellectual Limited; Margaret A. Burke; Sam T. Yip

(57) ABSTRACT

A water filtration membrane is provided, capable of removing heavy metal ions, filtering out particulates, filtering out bacteria, as well as removing herbicides and volatile organic compounds (VOCs) from water. The membrane is composed of a mat of randomly oriented nanoparticle-coated nanofibers. The nanofibers are covalently bonded to a plurality of substantially uniformly-distributed ceramic nanoparticles embedded in or adhered on the surface of the polymer nanofibers through reactive functional groups. The ceramic nanoparticles have a pattern of deep grooves formed on the nanoparticle surfaces. The bonding of the nanoparticles to the nanofibers is sufficient to retain the nanoparticles on the nanofiber surfaces when water flows through the water filtration membrane. The diameter of the nanofibers is 50-200 nm. The size of the nanoparticles is <40 nm, with a zeta potential of −40 to −45 mV in a dispersion medium. The nanoparticle deep grooves have an average size of approximately 1.2 nm or less.

19 Claims, 12 Drawing Sheets

(51) Int. Cl.

| | | |
|---|---|---|
| *D06M 11/79* | (2006.01) | |
| *D06M 10/06* | (2006.01) | |
| *D06M 11/71* | (2006.01) | |
| *D06M 11/45* | (2006.01) | |
| *C02F 101/22* | (2006.01) | |
| *C02F 101/32* | (2006.01) | |
| *B01D 71/42* | (2006.01) | |
| *B01D 71/34* | (2006.01) | |
| *B01D 71/38* | (2006.01) | |
| *B01D 71/26* | (2006.01) | |
| *B01D 71/68* | (2006.01) | |
| *B01D 71/54* | (2006.01) | |
| *B01D 71/56* | (2006.01) | |
| *B01D 71/08* | (2006.01) | |
| *B01D 71/02* | (2006.01) | |
| *D06M 23/08* | (2006.01) | |
| *D06M 13/513* | (2006.01) | |
| *C02F 1/44* | (2006.01) | |
| *D06M 101/28* | (2006.01) | |
| *D06M 101/22* | (2006.01) | |
| *D06M 101/24* | (2006.01) | |
| *D06M 101/38* | (2006.01) | |
| *D06M 101/34* | (2006.01) | |
| *D06M 101/10* | (2006.01) | |
| *D06M 101/30* | (2006.01) | |
| *D06M 101/26* | (2006.01) | |

(52) U.S. Cl.
CPC ............ *B01D 71/34* (2013.01); *B01D 71/38* (2013.01); *B01D 71/42* (2013.01); *B01D 71/54* (2013.01); *B01D 71/56* (2013.01); *B01D 71/68* (2013.01); *C02F 1/44* (2013.01); *D06M 10/06* (2013.01); *D06M 10/08* (2013.01); *D06M 11/45* (2013.01); *D06M 11/71* (2013.01); *D06M 11/79* (2013.01); *D06M 13/513* (2013.01); *D06M 23/08* (2013.01); *C02F 2101/22* (2013.01); *C02F 2101/322* (2013.01); *C02F 2303/04* (2013.01); *C02F 2305/08* (2013.01); *D06M 2101/10* (2013.01); *D06M 2101/22* (2013.01); *D06M 2101/24* (2013.01); *D06M 2101/26* (2013.01); *D06M 2101/28* (2013.01); *D06M 2101/30* (2013.01); *D06M 2101/34* (2013.01); *D06M 2101/38* (2013.01); *D06M 2400/01* (2013.01)

(58) Field of Classification Search
CPC ........ B01D 71/42; B01D 71/54; B01D 71/56; B01D 71/68; B01D 2323/26; B01D 2323/39; B01D 67/0004; B01D 69/141; B01D 69/148; B01D 71/028; B01D 67/0079; B01D 69/02; B01D 2325/02; B01D 2325/12; B01D 2325/40; C02F 1/44; C02F 2101/22; C02F 2101/322; C02F 2303/04; C02F 2305/08; C02F 2101/20; C02F 1/444; C02F 2101/30; C02F 2101/306; D06M 10/06; D06M 10/08; D06M 11/45; D06M 11/71; D06M 11/79; D06M 13/513; D06M 23/08; D06M 2101/10; D06M 2101/22; D06M 2101/24; D06M 2101/26; D06M 2101/28; D06M 2101/30; D06M 2101/34; D06M 2101/38; D06M 2400/01; B01J 20/0292; B01J 20/16; B01J 20/28007; B01J 20/28038; B01J 20/3212; B01J 20/3219; B01J 20/3234; B01J 20/3295
See application file for complete search history.

(56) References Cited

FOREIGN PATENT DOCUMENTS

| CN | 103214749 A | | 7/2013 |
|---|---|---|---|
| CN | 106031863 A | | 10/2016 |
| CN | 106693728 A | | 5/2017 |
| CN | 106824065 A | | 6/2017 |
| CN | 106987019 A | | 7/2017 |
| CN | 107955244 A | | 4/2018 |
| CN | 108342046 A | | 7/2018 |
| JP | H0841239 A | * | 2/1996 |
| JP | H0841239 A | | 2/1996 |

OTHER PUBLICATIONS

Nguyen et al. (Biological, Chemical, and Electronic, Macro Materials & Engineering, Sep. 24, 2012) (Year: 2012).*
Wang et al. (Nanofibrous microfiltration membranes, Joournal of Membrane Science, 446, pp. 376-382, Nov. 2013) (Year: 2013).*
Neubert et al. (Precise Deposition of Electrospun Nanofibers and Electrospraying of Nanoparticles, IFMBE Proceedings 25, pp. 124-127, 2009 (Year: 2009).*

* cited by examiner

DEEPLY GROOVED NANOPARTICLE-COATED NANOFIBERS

FIELD OF THE INVENTION

The invention relates to water filtration membranes and, more particularly, to water filtration membranes made from ceramic nanoparticle-coated polymeric nanofibers that are capable of removing heavy metals and filtering particulates and bacteria.

BACKGROUND

Nanoparticles have been combined with nanofibers for various technical applications. Various techniques for combining nanoparticles with nanofibers such as (1) blending, (2) coaxial electrospinning, (3) reduction of precursors and (4) surface adhesion are reviewed below.

(1) Blending

Blending is a conventional technique in which nanoparticles are mixed into a solution for electrospinning the nanofibers. Sonication is typically carried out for better dispersion of nanoparticles into the solution. Surfactants may also be added to assist in dispersion. However, since the nanoparticles are encapsulated within the fiber matrix, the nanoparticles' activity may be reduced. The major drawbacks of combining nanoparticles with nanofibers by blending are: (i) poor dispersion of nanoparticles; (ii) poor exposure of nanoparticles.

(2) Coaxial Electrospinning

A core-shell fiber morphology allows a targeted distribution of nanoparticles, either closer to a surface or at the core, of nanofibers. Such a fiber structure can be generated by coaxial electrospinning, which involves the use of a coaxial spinneret where the distribution of the material is determined by the feed solution extrusion either at the outer outlet or the core outlet. The major drawbacks of combining nanoparticles with nanofibers by coaxial electrospinning are: (i) low productivity; (ii) poor homogeneity.

(3) Reduction of Precursors

Instead of adding nanoparticles into the solution for electrospinning, an inorganic salt precursor may be added to the electrospinning solution and electrospun to form fibers. As the inorganic salt may be dissolved in the solution, its dispersion will be more uniform. A subsequent reduction is performed to convert the salt into nanoparticles. For example, silver nitrate may be dissolved in an electrospinning solution followed by photo-reduction using UV irradiation, thermal reduction at 80° C. or aging to form silver nanoparticles. The major drawbacks of combining nanoparticles with nanofibers by reduction of precursors are: (i) limited choices of materials; (ii) complicated manufacturing process.

(4) Surface Adhesion

Direct Electrospinning of Nanofibers onto Suspension of Nanoparticles

In this process, a suspension of nanoparticles is used with electrospinning directly on the suspension. In this technique, nanoparticles may adhere to the surface of the fibers as they are formed.

Simultaneous Electrospinning and Electrospraying

Simultaneous electrospinning and electrospraying may be used to incorporate nanoparticles on the surface of the nanofibers within a membrane. Alternatively, an ultrasonic atomizer, airbrush or other spraying device may be used in place of electrospraying. Spraying may be directed at an electrospinning jet such that particles are attached to the fiber surface prior to fiber deposition on a mat or at the opposite side of a rotating collector.

Chemically active nanoparticles on the surface of nanofibers can increase the activity of the composite. However, there is a risk that the nanoparticles may get dislodged from the nanofiber and causes health and environmental risks. Thus, there is a need in the art for effective techniques of affixing nanoparticles on nanofiber surfaces, particularly for techniques that may be scaled for commercial production.

SUMMARY OF THE INVENTION

The present invention provides a water filtration membrane capable of removing heavy metal ions, filtering out particulates, filtering out bacteria, as well as removing herbicides and volatile organic compounds (VOCs) from water. The membrane is composed of a mat of randomly oriented nanoparticle-coated nanofibers. The nanofibers are covalently bonded to a plurality of substantially uniformly-distributed ceramic nanoparticles embedded in or adhered on the surface of the polymer nanofibers through reactive functional groups. The ceramic nanoparticles have a pattern of deep grooves formed on the nanoparticle surfaces. The bonding of the nanoparticles to the nanofibers is sufficient to retain the nanoparticles on the nanofiber surfaces when water flows through the water filtration membrane. The size of interstitial pores between the nanofibers is 100-300 nm. The diameter of the nanofibers is 50-200 nm. The size of the nanoparticles is <40 nm with a zeta potential of greater than −40 mV, preferably −41 to −44 mV, more preferably −42 to −43 mV, most preferably −42 mV, in a dispersion medium.

The nanoparticle deep grooves have an average size of approximately 1.2 nm or less. The nanoparticles may be selected from adsorbents such as aluminosilicate, aluminophosphate, and aluminum oxide for removing heavy metal ions. An exemplary polymeric material for the nanofibers may be polyacrylonitrile (PAN) or polyvinylidene fluoride (PVDF).

DETAILED DESCRIPTION

Nanoparticles have the potential to exhibit novel properties due to a quantum size effect. However, nanoparticles often require a carrier for most practical application. While having a smaller surface area compared to nanoparticles, nanofibers are able to function as a scaffold to hold nanoparticles and prevents their aggregation. A combination of nanofibers and nanoparticles has the potential to maximize the effective functional output from nanoparticles. After the combination, the nanoparticles are either embedded in the nanofiber matrix or adhered to its surface.

In the prior art, nanoparticle-coated nanofibers have many or all of the following limitations: poor dispersion of nanoparticles, poor exposure of nanoparticles, low productivity, poor homogeneity, limited choices of materials, and complicated manufacturing processes. The present nanoparticle-coated nanofibers and associated method of making solve the aforementioned problems.

In one aspect, the nanofibers of the present invention are polymer nanofibers. The polymer may be selected from various materials, including, but not limited to, polyacrylonitrile, poly(vinylidene fluoride), poly(vinylidene fluoride-co-hexafluoropropylene), polyvinylpyrrolidone, poly(vinyl alcohol), poly(ethylene oxide), polysulfone, polyethersulfone, poly(methyl methacrylate), polyurethane, or polyamide 6, chitosan, and mixtures thereof. The polymer has functional groups selected from hydroxyl groups, amide groups, carboxyl groups or nitrile groups. The nanoparticles may be ceramic particles. As used herein, the term "ceramic" relates to an inorganic, non-metallic, often crystalline oxide, nitride or carbide material. Some elements, such as carbon or silicon, may be considered ceramics. In an embodiment, oxides are used such as aluminosilicates, aluminophosphates, titanium dioxide, or mixtures thereof.

Figure 1A:
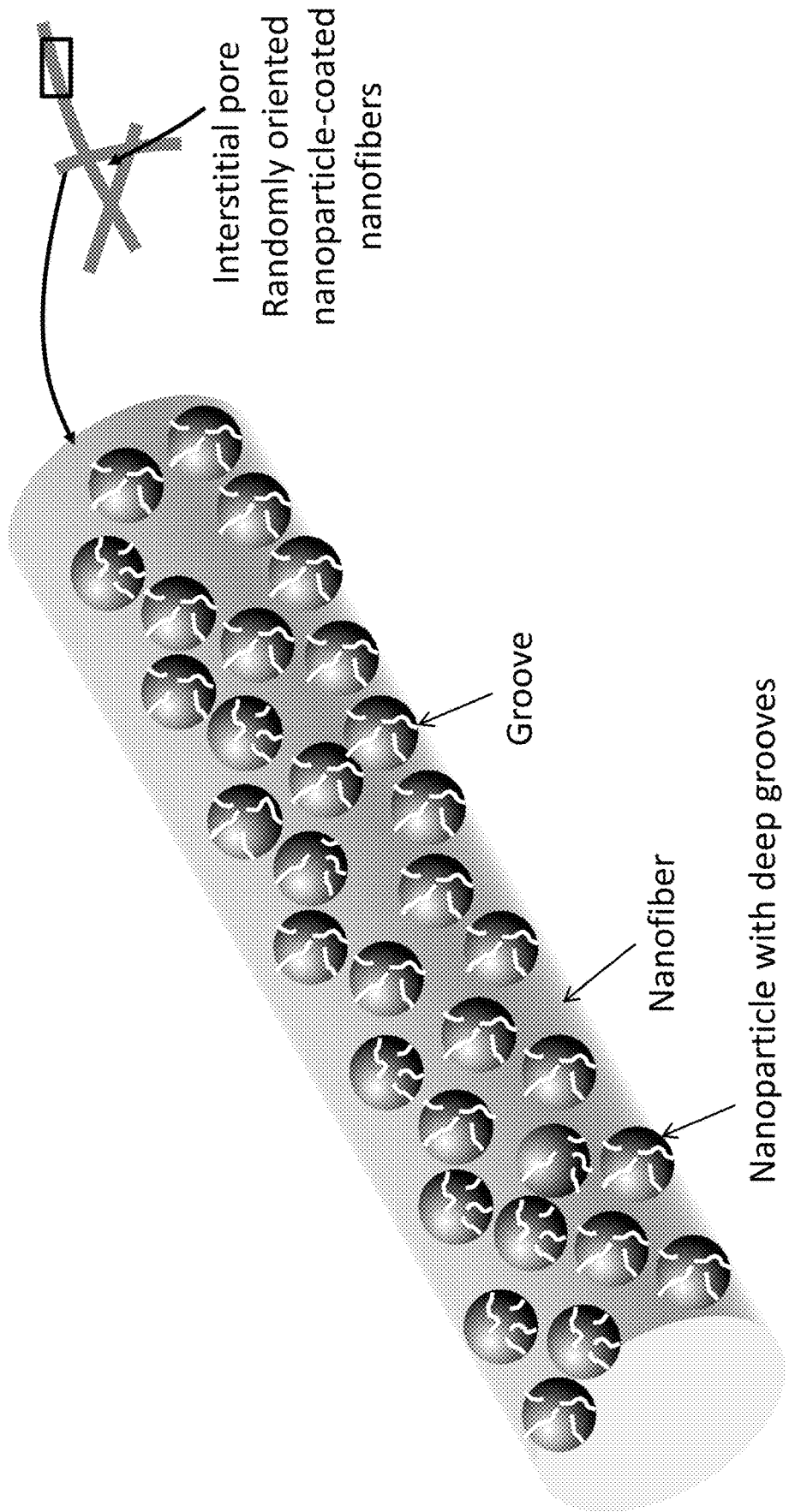
FIG. 1(a) schematically depicts a nanofiber with deeply-grooved nanoparticles.
Figure 1B:
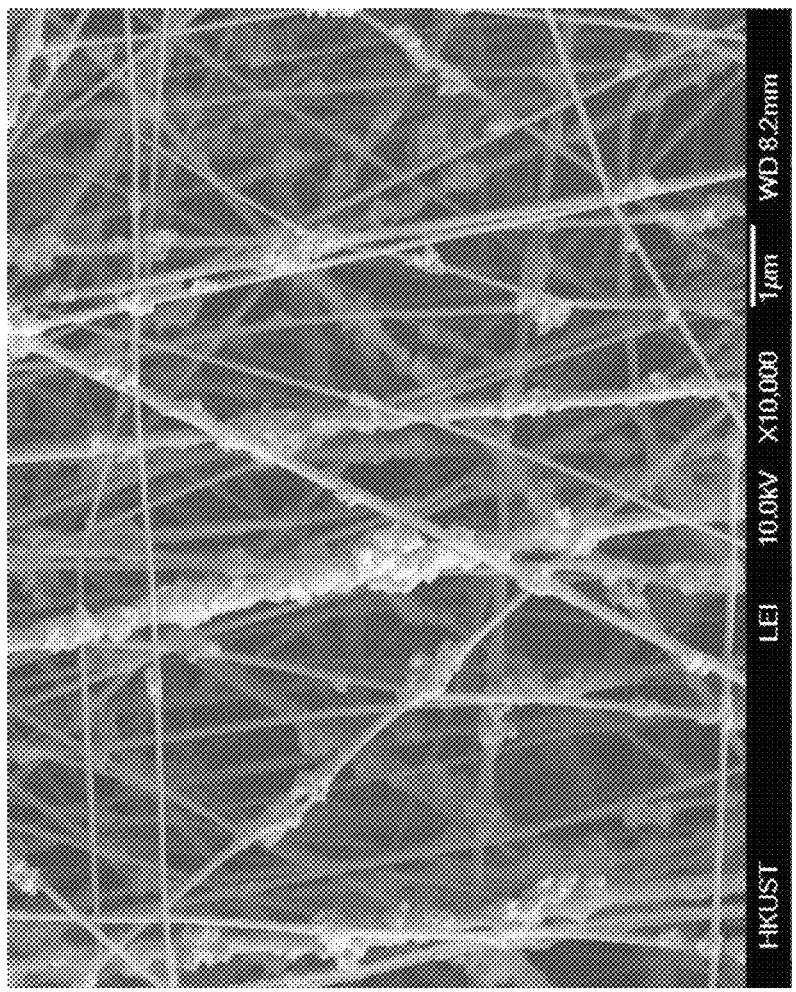
FIG. 1(b) shows an SEM image of a membrane composed of a plurality of randomly oriented nanoparticle-coated nanofibers. The nanofiber is made of polyacrylonitrile. The nanoparticle is an aluminosilicate.

Due to the homogeneous deposition of nanoparticles and excellent exposure of nanoparticles on the nanofibers, the activity of nanoparticles can be fully utilized. In one aspect, a one-step free-surface electrospinning may be used to manufacture nanoparticle-coated nanofibers, mass production is possible, thus facilitating the application of the said nanoparticle-coated nanofibers to commercial products. Having the deep grooves in the nanoparticles, the activity of the nanoparticles can be further enhanced: for instance, more heavy metal ions can be adsorbed if the nanoparticles are adsorbents. With the covalent bonding between the nanoparticles and the nanofibers, the nanoparticle-coated nanofiber structure can be used in applications such as water filtration without worrying about the leaching problem of the nanoparticles. FIG. 1(*a*) schematically depicts deeply-grooved nanoparticles on a nanofiber. FIG. 1(*b*) is an SEM image of deeply-grooved nanoparticles incorporated with nanofibers.

1. Synthesis of Nanoparticles:

The nanoparticles may be synthesized by hydrothermal reaction. With careful control of temperature, time and reactant composition, seeds of the nanoparticles are formed via an aging process. Typically, two reaction solutions, solution 1 and 2, are prepared separately prior to the synthesis. Solution 1 is prepared by adding precursors such as aluminum or aluminum hydroxide slowly into sodium hydroxide solution of concentration 4 to 20 mol/L, preferably 12 to 15 mol/L, to achieve a concentration of 1.5 to 3.7 mol/L, preferably 1.7 mol/L. Solution 2 is prepared by adding silicon dioxide solution or sodium meta-silicate with a concentration of 7.1 to 11.1 mol/L, preferably 7.1 mol/L, to a sodium hydroxide solution with a concentration of 4 to 28 mol/L, preferably 11.8 mol/L, to achieve a concentration of 4.2 to 6.3 mol/L, preferably 4.9 mol/L. The solution is then heated to 80 to 110° C., preferably 100° C. for 5 to 10 minutes, preferably 6 minutes. Solution 1 is then added drop-wise to solution 2 using a precise controlled dispensing device at a dispensing rate of 0.15 to 0.40 ml per minute, preferably 0.17 ml per minute, under vigorous stirring at a temperature between 0 to 25° C., preferably 4° C. The hydrothermal synthesis is then carried out at 25 to 120° C., preferably 60° C., for 70 minutes to 72 hours, preferably 45 hours. The seeds are allowed to grow in an organized manner, while deep grooves are formed throughout the nanoparticle structure. Finally, the nanoparticles are suspended into other dispersant, such as ethyl alcohol, water and dimethylformamide, by means of solvent exchange using simple centrifugation. Using these techniques, nanoparticles having a size of approximately 5 to 50 nm, preferably 18 to 45 nm, are formed.

Figure 2B:
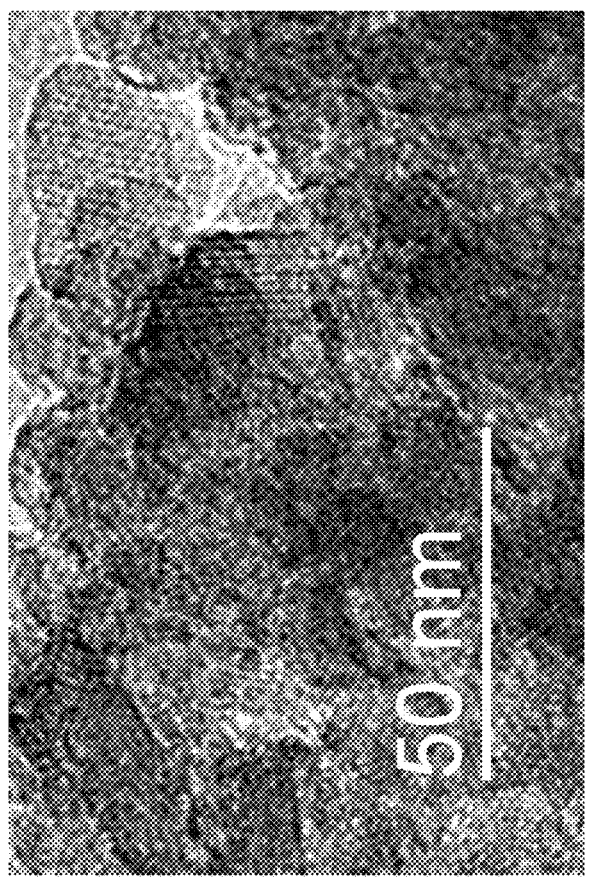
FIG. 2(a) and FIG. 2(b) are TEM images depicting the morphology of nanoparticles, demonstrating deep grooves within the structure.
Figure 2A:
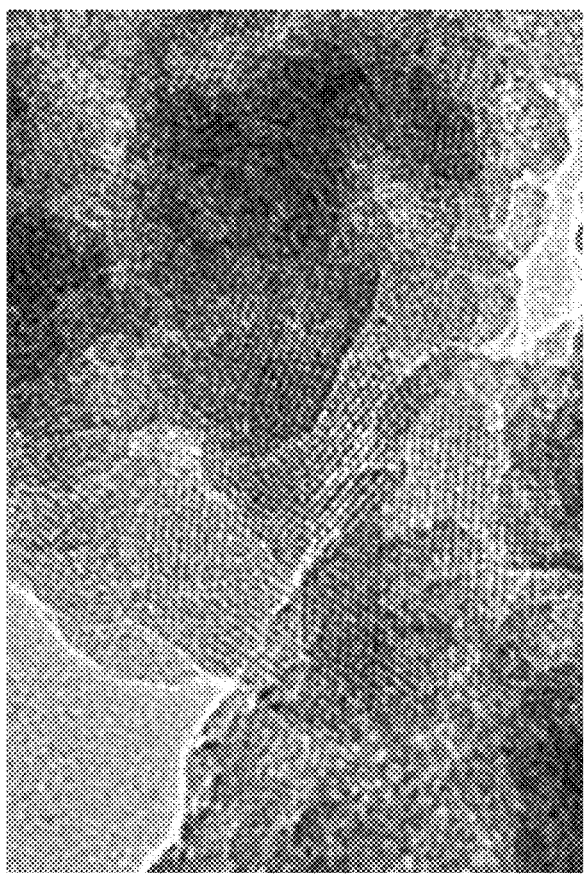
Figure 3:
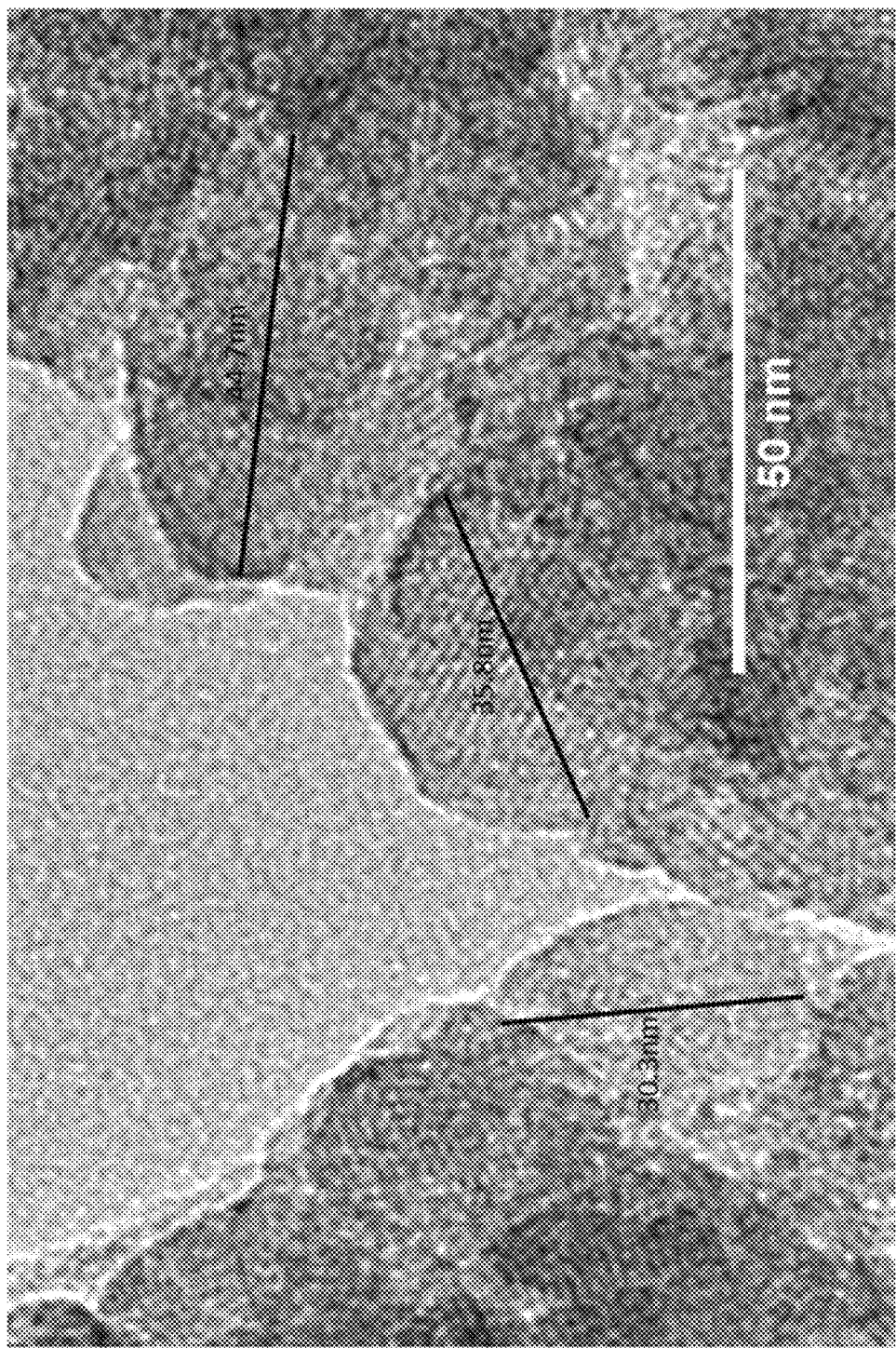
FIG. 3 shows a TEM image with various particle size measurements.

An example of the deeply-grooved texture of the nanoparticles is seen in the TEM images of FIGS. 2 and 3. The grooves form a textured array on the surface of the particle in a periodic structure that substantially increases the surface area of the nanoparticles.

2. Functionalization of Nanoparticles:

Following synthesis, the nanoparticles are functionalized with a molecule having a reactive group that can bond with a polymeric nanofiber. In one aspect, the functionalization material may be an organosilane, for example 3-aminopropyltri ethoxysilane, 3-aminopropyldiethoxymethylsilane, 3-aminopropyltrimethoxysilane, chlorodimethylsilane and trichlorosilane. The functional group may be a hydroxyl group, an amine, group or a silanol group. Typically, 0.1 to 10 g of nanoparticles are suspended in a dispersant solvent, such as ethyl alcohol, iso-propyl alcohol, hexane or toluene, under continuous nitrogen or argon purge. Organosilane is then added to the mixture dropwise using a precise controlled dispensing device at a rate of 0.15 to 0.40 ml per minute. The mixture is refluxed at 60 to 120° C., preferably 80 to 100° C., for 4 to 28 hours. This grafts reactive functional groups onto the nanoparticles to improve the adhesion of the nanoparticles at the nanoparticle/polymer interface. Functionalization also increases the zeta potential of the nanoparticles, ensuring uniform and stable dispersion in the polymer solution. Functionalization is confirmed by Raman spectroscopy and zeta potential.

Figure 4:
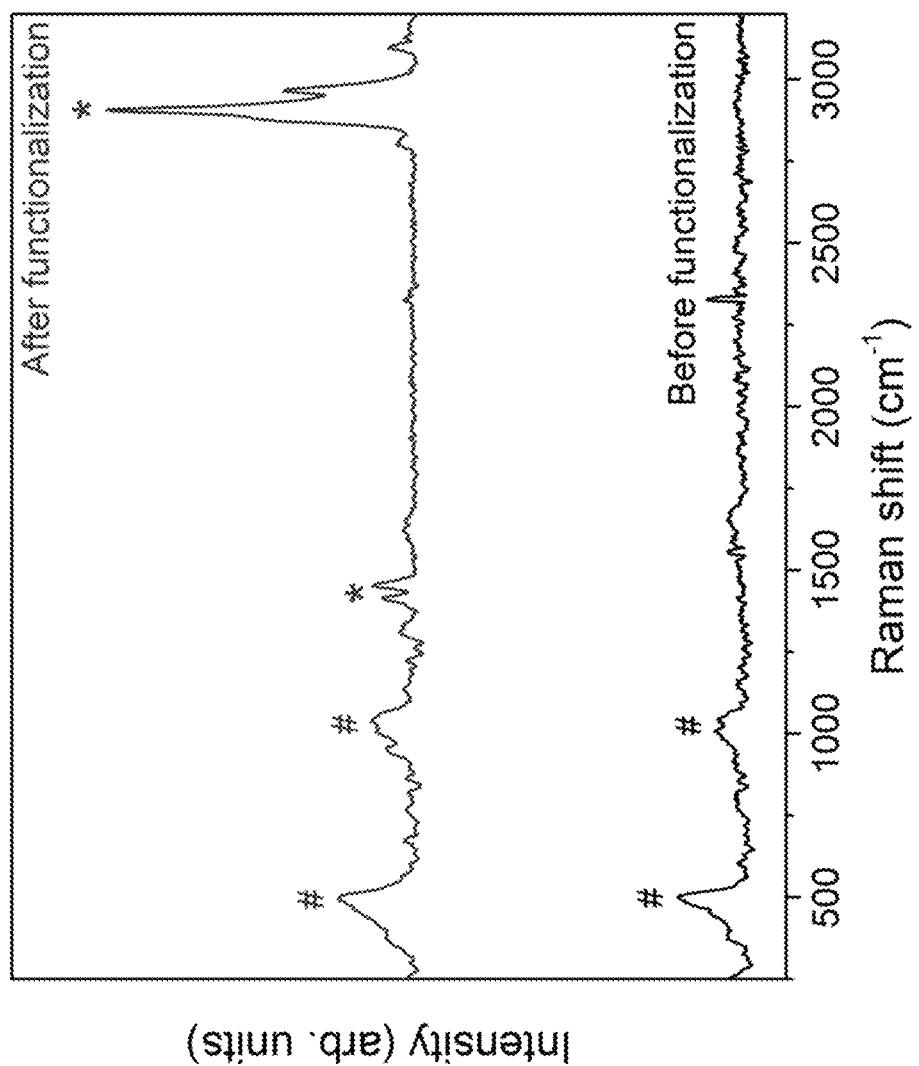
FIG. 4 shows the introduction of amine functional groups onto the nanoparticles after functionalization.
Figure 7:
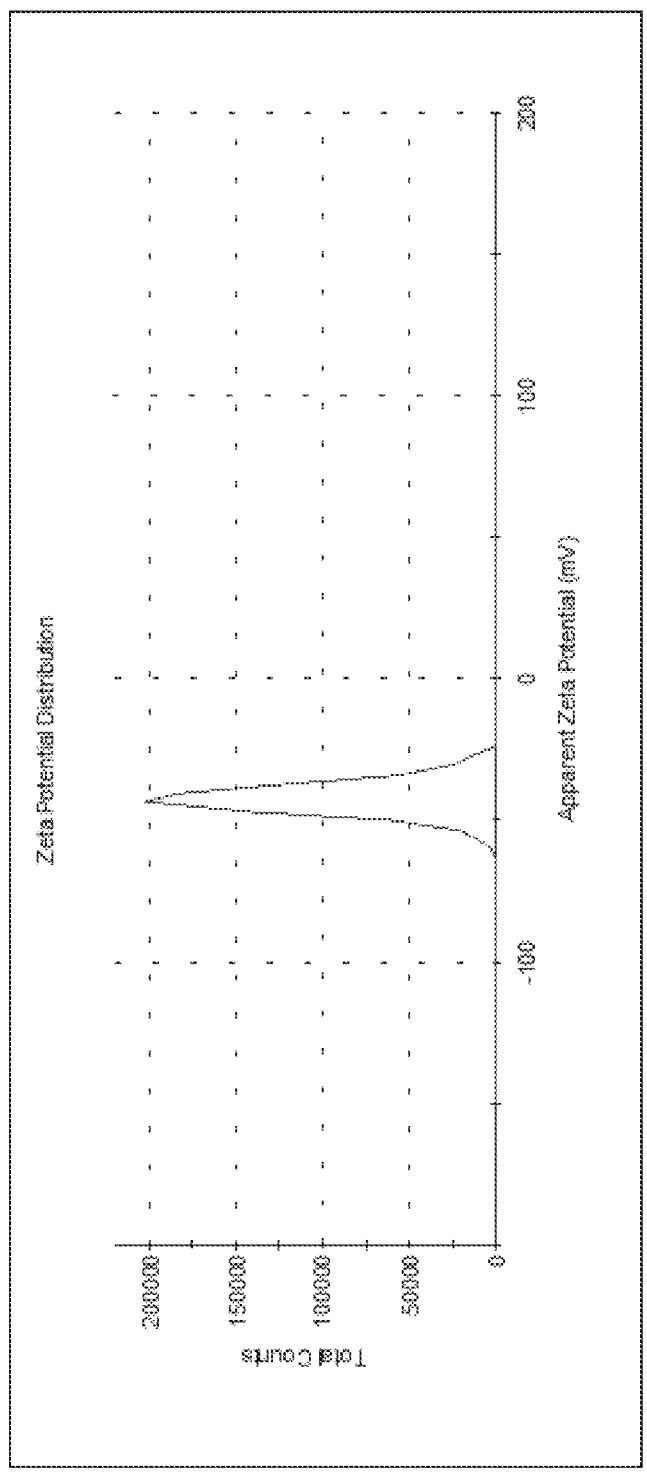
FIG. 7 shows the Zeta potential of functionalized deeply-grooved nanoparticles.

FIG. 4 is Raman spectrum of deeply-grooved nanoparticles before (black) and after (red) functionalization. Peaks (#) are characteristic of the deeply-grooved nanoparticles. The presence of peaks (*) confirms successful introduction of functional groups onto the deeply-grooved nanoparticles. FIG. 7 depicts the zeta potential of the functionalized deeply-grooved nanoparticles.

3. Formation of Nanofibers Incorporating Nanoparticles:

Free-surface electrospinning, a technique that is suitable for industrial scale-up. In free-surface electrospinning, a grounded moving substrate is placed at a distance above an electrode such that there is an electric potential difference created between the electrode and the substrate. When a polymeric precursor solution is coated onto the electrode, an electric force is applied to the solution. Multiple cone-like structures are formed along the electrode due to the interaction between the electric force applied to the solution and the surface tension of the solution. When the electric force overcomes the surface tension, a polymer jet is initiated from each cone-like structure. After solvent evaporation, the polymer jet solidifies, forming the nanofibers.

For example, salts, such as tetrabutylammonium bromide, benzyltriethylammonium chloride, and cetyltrimethylammonium bromide, are dissolved in organic solvents, preferably polar organic solvents, and more preferably dimethylformamide or dimethylsulfoxide, containing the functionalized nanoparticles at a concentration of 2.5 to 20 w/v %, preferably 2.5 to 10 w/v %, and more preferably 4 to 6 w/v %, to achieve a salt concentration of 0.2 to 2.5 mol/L, preferably 0.8-0.9 mol/L. Polymers, such as polyacrylonitrile, poly(vinylidene fluoride), poly(vinylidene fluoride-co-hexafluoropropylene), polyvinylpyrrolidone, poly(vinyl alcohol), poly(ethylene oxide), polysulfone, polyethersulfone, poly(methyl methacrylate), polyurethane, polyamide 6 or chitosan, are added into the solvent containing salt and nanoparticles to achieve a concentration of 1.5 to 15 w/v %, preferably 8 to 12 w/v %. The polymer solution is then mixed until homogenous using a magnetic stirrer at 350 to 600 rpm at temperature of 40 to 80° C. The polymer solution is subsequently used for free surface electrospinning. An example of working condition of free surface electrospinning is 150 to 250 mm working distance between the anode and cathode electrodes, preferably 180 to 200 mm, 15 to 120 kV DC high voltage, preferably 60 to 120 kV, more preferably 80 to 100 kV, with a substrate collecting speed of 0 to 5000 mm/min depending on thickness.

Figure 8:
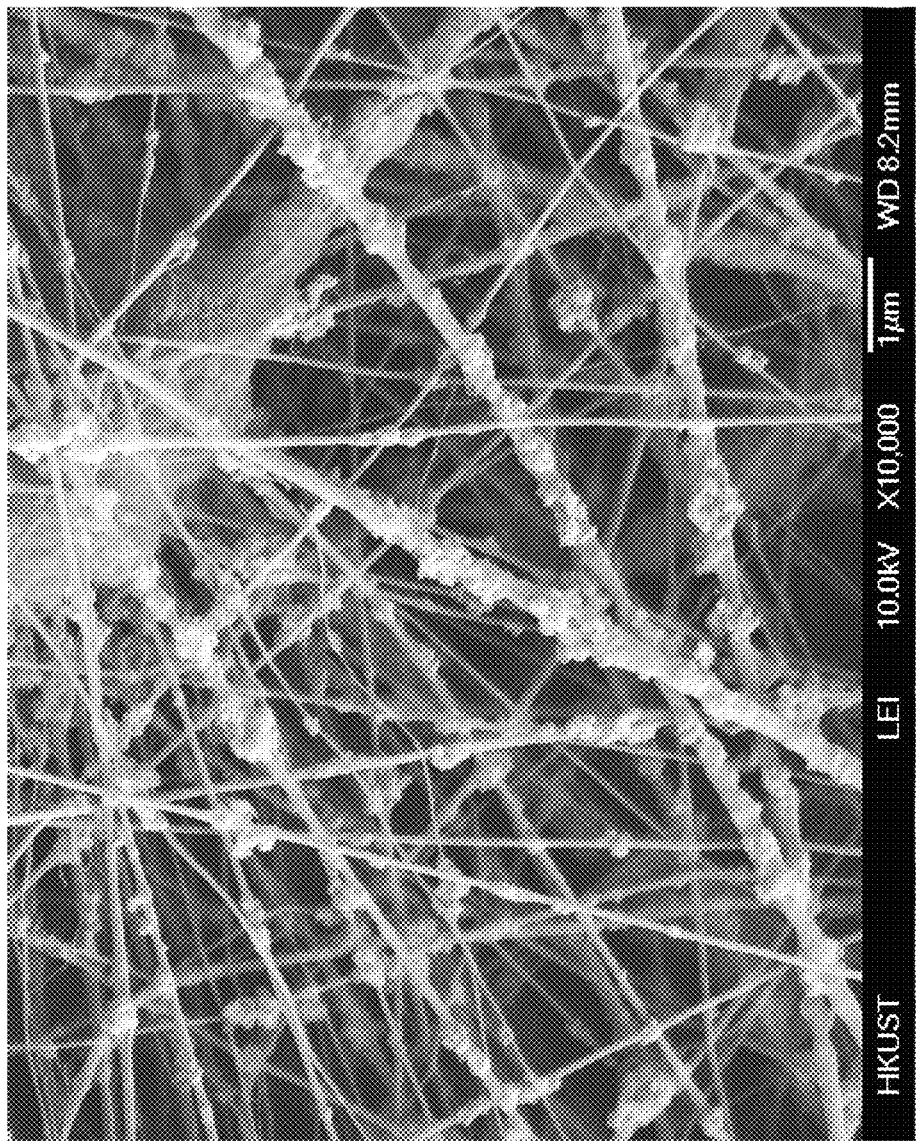
FIG. 8 shows an SEM image of nanoparticles remaining intact on the nanofiber membrane after immersion in water for 4 weeks.
Figure 11:
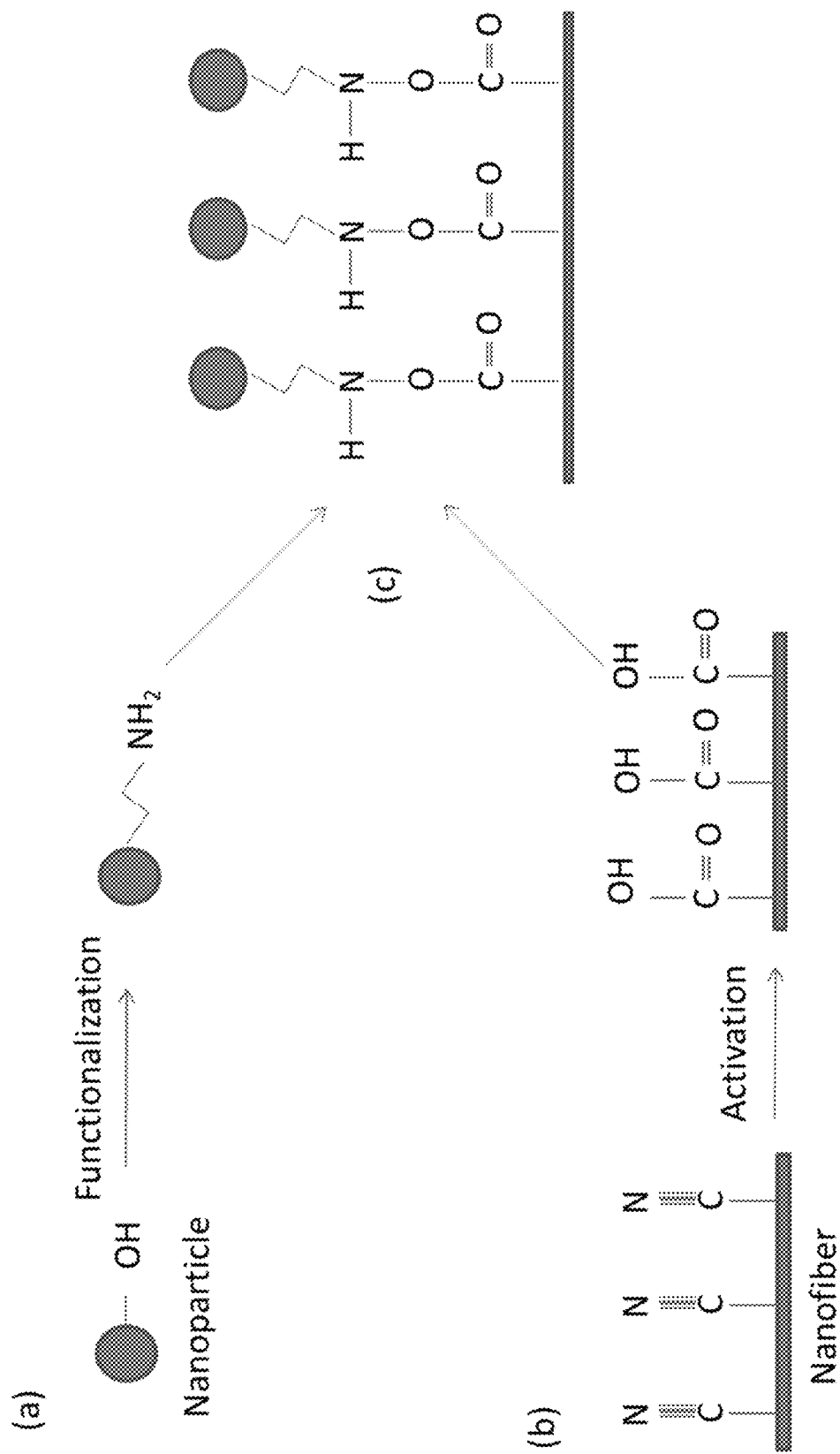
FIG. 11 is schematic diagram depicting the reaction process of functionalization of a nanoparticle, activation of a nanofiber, and covalent attachment of a nanoparticle onto a nanofiber.

Following fabrication, the nanofiber and functionalized-nanoparticles are activated chemically to create strong and stable covalent bonding between the nanofiber and nanoparticles. For example, the nanofiber and functionalized-nanoparticles composite is immersed in 0.5 to 2.5 mol/L sodium hydroxide, preferably 1.8-2.1 mol/L, at a temperature of 50 to 100° C. for 20 to 60 minutes. The composite is then washed then neutral pH with distilled water. Subsequently, an amide bond is formed between the carboxyl group on the activated nanofiber and amine group on the functionalized nanoparticles. This is done by an EDC/NHS coupling reaction. It prevents the nanoparticles from washing off during the water filtration process, as confirmed by SEM. As seen in FIG. 8, nanoparticles remain bound to nanofibers after immersion in tap water for four weeks. FIG. 11 is schematic diagram of functionalization where (a) is the functionalization of a nanoparticle, (b) is the activation of nanofibers and (c) is the covalent attachment of the nanoparticle onto the nanofiber.

Figure 5:
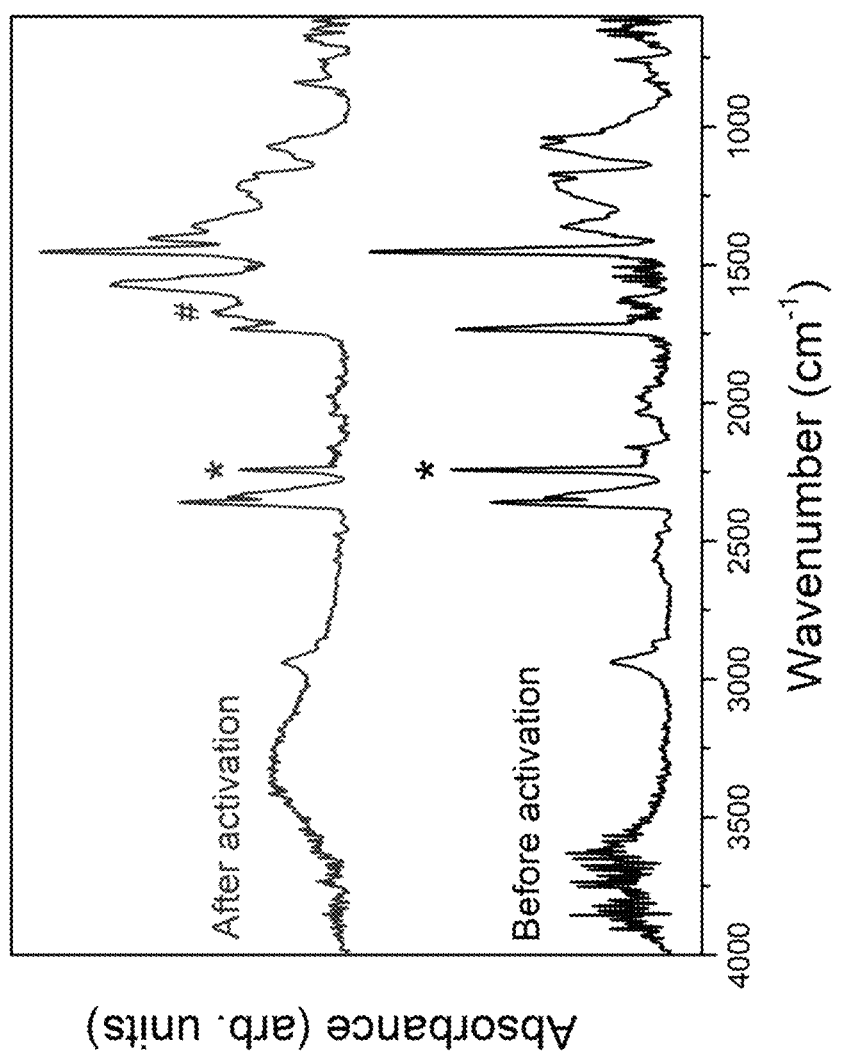
FIG. 5 shows the FTIR of the nanofibers before activation. Active functional groups, such as carboxyl groups, are introduced to the polymer nanofiber by functionalization.

FIG. 5 is an FTIR spectrum of a nanofiber membrane before and after activation. Peak (#) shows presence of carboxyl functional group after activation. Decrease in peak (*) intensity shows the disappearance of nitrile functional group after activation.

Figures 6A, 6B:
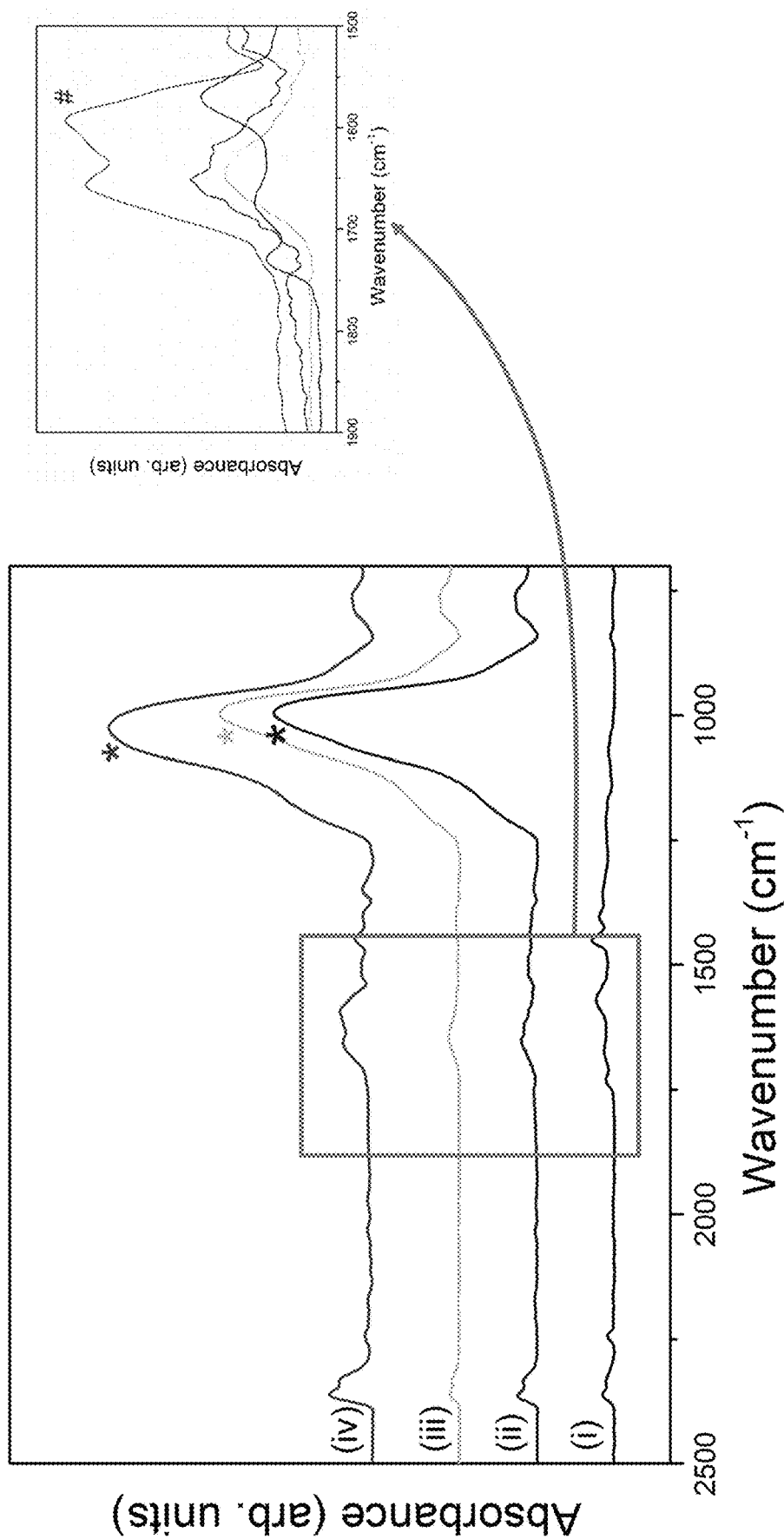
FIG. 6(a) and FIG. 6(b) show the presence of carboxyl functional groups (peak #) and the disappearance of nitrile functional groups (peak *) of PAN after functionalization.

FIG. 6(*a*) is an FTIR spectrum of (i) activated nanofibers without deeply grooved nanoparticles, (ii) deeply-grooved nanoparticles after functionalization, (iii) functionalized deeply-grooved nanoparticles-loaded activated nanofiber membrane before covalent bond activation, and (iv) functionalized deeply-grooved nanoparticles-loaded activated nanofiber membrane after covalent bond activation. Peaks (*) indicate presence or successful loading of functionalized deeply-grooved nanoparticles. FIG. 6(*b*) is an expanded view of FIG. 6(*a*) at wavenumber 1500-1900 cm$^{-1}$. Peak (#) indicates the successful introduction of an amide bond after covalent bond activation.

Using the techniques of the present invention, the nanoparticles have a very high zeta potential in a dispersion medium, leading to a homogeneous deposition of nanoparticles on the electrospun nanofibers. Using the small-sized nanoparticles with particle diameter range of approximately 5 to 50 nm, the particles are well-dispersed in an electrospinning medium, thus permitting the use of substantial amounts of nanoparticles, leading to excellent exposure of nanoparticles on the electrospun nanofibers, as seen in FIG. 1(*b*).

Advantages:

1. Using free-surface electrospinning, a needle or spinneret is not needed, simplifying the overall process and increasing productivity, and widening the choices of polymeric materials. Free-surface electrospinning creates a one-step process for manufacturing nanoparticle-coated nanofibers.

2. Each nanoparticle possesses deep grooves, thus increasing the overall specific surface area of the whole nanoparticle-coated nanofiber structure significantly. For example, more heavy metal ions can be adsorbed when the nanoparticles are adsorbents 3. Each nanoparticle is functionalized such that each nanoparticle is attached to the nanofiber by covalent bonding, preventing the nanoparticles from dislodging and minimizing health and environmental risks.

Figure 9:
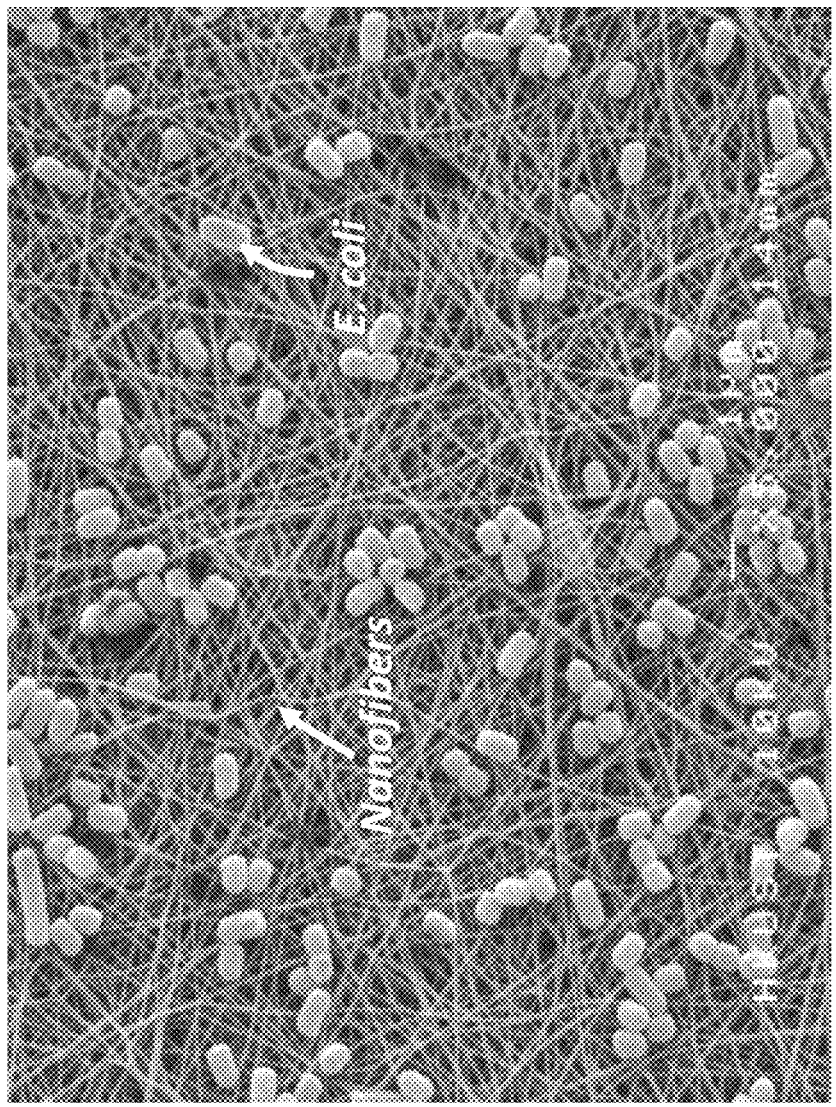
FIG. 9 is an SEM micrograph showing sieved *E. coli* on nanofibers.
Figure 10:
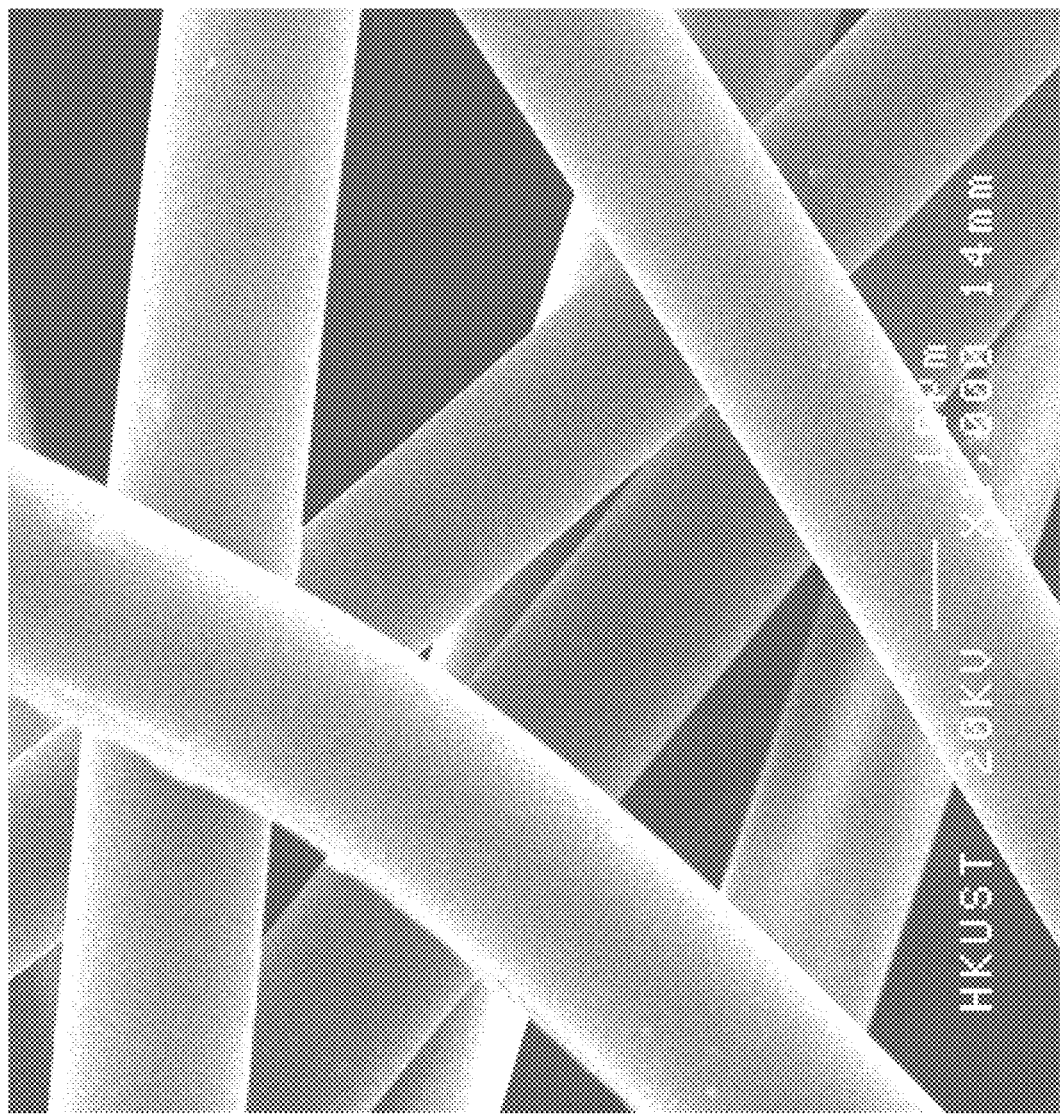
FIG. 10 is an SEM micrograph showing a nonwoven substrate without nanofibers and nanoparticles.

Example: Filtration using the membranes of the present invention:

The filtration efficiencies for 3 μm particulate of nanofibers with and without functionalized deeply-grooved nanoparticle-coatings are 98% and 80%, respectively. The filtration efficiencies for submicron particulates (0.5 to 1 μm) of uncoated nanofibers and functionalized deeply-grooved nanoparticle-coated nanofibers are 70% and 88%, respectively. The removal efficiencies for Cr, Cu and Cd of uncoated nanofibers are 9%, 23% and 28%, respectively. The removal efficiencies for Cr, Cu and Cd of functionalized deeply-grooved nanoparticle-coated nanofibers are 18%, 83% and 92%, respectively. Addition of functionalized deeply-grooved nanoparticles significantly improves the removal of micron-sized particulates and heavy metal ions. Both uncoated nanofibers and nanofibers coated with the functionalized deeply-grooved nanoparticles demonstrate filtration efficiency for *E. coli* of 100%. FIG. 9 is an SEM image showing the sieved *E. coli* on the nanofibers. FIG. 10 is an SEM image of a nonwoven substrate without nanofibers. Without the nanofibers, the nonwoven substrate alone cannot filter out *E. coli* by sieving. Sieved *E. coli* cannot be seen on the microfibers of the nonwoven substrate after filtration efficiency test for *E. coli* using the nonwoven substrate alone without nanofibers.

It should be apparent to those skilled in the art that many modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "includes", "including", "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A water filtration membrane comprising:
   a nonwoven mat of randomly-oriented polymer nanofibers (nanofibers); and
   a plurality of substantially uniformly-distributed ceramic nanoparticles (nanoparticles) embedded in or adhered on the surface of the polymer nanofibers through covalently bonded reactive functional groups, the ceramic nanoparticles having a pattern of deep grooves formed on the nanoparticle surfaces and being made of aluminosilicates or aluminophosphates, wherein the nanoparticles have a diameter of approximately 5 to 50 nm;
   and wherein the nanoparticle deep grooves have an average size of less than approximately 1.2 nm, the grooves forming a textured array on the surface of the particle in a periodic structure that increases the surface area of the nanoparticles; and
   the bonding of the nanoparticles to the nanofibers is sufficient to retain the nanoparticles on the nanofiber surfaces when water flows through the water filtration membrane.

2. The water filtration membrane of claim 1, wherein interstitial pores between the nanofibers bonded to the ceramic nanoparticles have a diameter of approximately 100 to 300 nm.

3. The water filtration membrane of claim 1, wherein the nanofibers have a diameter of approximately 50 to 200 nm.

4. The water filtration membrane of claim 1, wherein the nanoparticles have a zeta potential of −42 mV in a dispersion medium.

5. The water filtration membrane of claim 1, wherein the polymer nanofibers are selected from polyacrylonitrile, poly(vinylidene fluoride), poly(vinylidene fluoride-co-hexafluoropropylene), polyvinylpyrrolidone, poly(vinyl alcohol), poly(ethylene oxide), polysulfone, polyethersulfone, poly(methyl methacrylate), polyurethane, polyamide 6, or chitosan, and mixtures thereof.

6. The water filtration membrane of claim 1, wherein the reactive functional groups are selected from a hydroxyl group, an amine group or a silanol group.

7. The water filtration membrane of claim 1, wherein the membrane is configured to adsorb heavy metal ions.

8. The water filtration membrane of claim 1, wherein the membrane is configured to filter out particulates.

9. The water filtration membrane of claim 1, wherein the membrane is configured to filter out bacteria.

10. The water filtration membrane of claim 1, wherein the membrane is insoluble in water.

11. The water filtration membrane of claim 1, wherein the membrane has a filtrate flux of 1-3 L/min.

12. The water filtration membrane of claim 1, wherein said membrane is configured to remove 85-88% of submicron particulates having size ranging from 0.5 μm to 1.0 μm.

13. The water filtration membrane of claim 1, wherein said membrane is configured to remove 95-98% of 3 μm particulates.

14. The water filtration membrane of claim 1, wherein said membrane is configured to remove 90-99% of lead.

15. The water filtration membrane of claim 1, wherein said membrane is configured to remove 10-30% of chromium.

16. The water filtration membrane of claim 1, wherein said membrane is configured to remove 80-99% of copper.

17. The water filtration membrane of claim 1, wherein said membrane is configured to remove 90-99% of cadmium.

18. The water filtration membrane of claim 1, wherein said membrane is configured to remove 100% of bacteria when incorporated into a filter assembly.

19. The water filtration membrane of claim 5, wherein the polymer has functional groups selected from hydroxyl groups, amide groups, carboxyl groups or nitrile groups.

* * * * *